Nov. 28, 1967  J. P. RUPERT  3,355,004
STORAGE BINS
Filed June 8, 1966
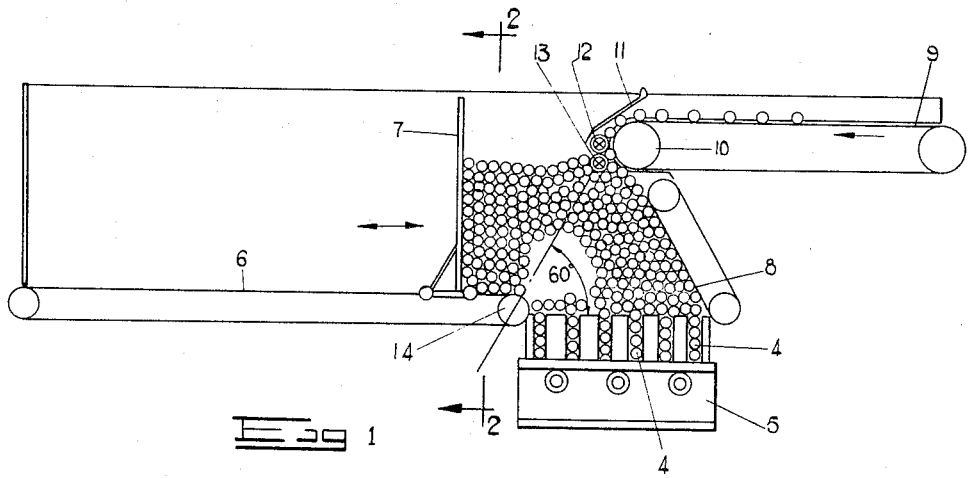
INVENTOR
JOHN P. RUPERT
BY Young & Thompson
Attys 3,355,004
STORAGE BINS
John P. Rupert, Stellenbosch, Cape Province, Republic of South Africa, assignor to Tobacco Research & Development Institute (Proprietary) Limited
Filed June 8, 1966, Ser. No. 556,030
Claims priority, application Republic of South Africa, June 17, 1965, 3,194/65
7 Claims. (Cl. 198—44)

ABSTRACT OF THE DISCLOSURE

A bin for storing filter rods consists in a trough the width of which equals the length of a rod, a fixed end at which rods are fed to the trough and below which articles are withdrawn through slots in the base of the trough, an endless conveyor forming the remainder of the base of the trough, a movable wall mounted on the conveyor, and means for sensing the level of rods over the withdrawal point arranged to actuate the conveyor to expand or contract the storage capacity of the bin while rods are flowing through the bin.

---

This invention relates to storage bins.

In recent times cigarette manufacture is being more and more improved, the machines work at greater speeds and articles are being conveyed between machines at greater speeds. Where two machines are linked together, e.g. a filter making machine feeding a cigarette making machine, the machine second in line may undergo a temporary stoppage. In such a case it is desirable to have a suitable storage bin.

An object of the invention is to provide a bin which is adapted to expand to meet the requirements of increased storage space and which is adapted to contract as less is required to be stored while moving material in the bin towards a fixed withdrawal point.

A storage bin according to the invention consists in an elongated trough, at one end of the trough a withdrawal point in its base, a movable band forming the floor of the bin except over the withdrawal point and a false end to the trough mounted on the movable band and movable towards and away from the withdrawal point by moving the band.

The invention is further discussed with reference to the accompanying drawings, in which FIGURE 1 is a side elevation of a storage bin with one side removed, FIGURE 2 is a section on the line 2—2 of FIGURE 1 and FIGURE 3 is a similar view of another embodiment.

The embodiments illustrated are designed to store rod-shaped articles, e.g. filter rods between a filter making machine and a cigarette making machine. It consists in a trough which is shaped as shown in FIGURE 2. The width of the trough is the same as the length of a filter rod.

The base of the bin has a portion having withdrawal slots 4 feeding a consumption device 5 which feeds, e.g. a pneumatic conveyance system. The remainder of the base is formed by the upper run of a conveyor belt 6 one end pulley 14 of which is near the slots 4. On the belt 6 there is mounted a false end wall 7. Depending on which way the belt 6 runs the wall 7 will move to left or right.

The other end wall of the trough is formed by the inner run of another conveyor belt 8. This belt moves only in the direction of the arrow.

The bin is fed by a conveyor belt 9 which may be the catcher band of a filter making machine. At the head pulley 10 there is a felt finger 11 which serves to maintain the orientation of articles coming over the head pulley.

The belt 8 is inclined at an angle equal to the angle of repose of the rods being stored in the bin. Note also that the feed point is at the apex of a pyramid both sides of which are inclined at that angle, one side being the belt 8.

Two photo-electric cells 12 and 13 co-operating with light sources (not shown) control the movement of the wall 7. If the cell 12 is covered the bin is getting too full for the present position of the wall 7. Hence the cell 12 actuates a circuit which causes the belt to move in a direction which moves the wall 7 to the left. With the cell 12 uncovered and the cell 13 still covered the wall 7 comes to rest and stays at rest. If the cell 13 is uncovered the wall 7 starts to move to the right. At the same time the belt 8 starts to move thus preventing crushing of articles over the slots 4.

Where space considerations do not allow for a bin as illustrated in FIGURE 1, the bin of FIGURE 3 may be used. In this case there are two false walls 27 each mounted on its own belt. In this case crushing upon closing up of the bin is prevented by two vertical, parallel and adjacent belts the outer runs of which move upwardly. A deflector 16 under the delivery point ensures equal distribution to either side. For the rest this embodiment is the same as the previous one.

If necessary rotary agitators may be provided over the slots 4 in each case.

I claim:
1. A storage bin consisting in an elongated trough, a fixed end to the trough, means for continuously feeding articles to the bin at the fixed end, a withdrawal point in the base of the bin adjacent the fixed end for continuously withdrawing articles from the bin, a movable band forming the floor of the bin except over the withdrawal point, a false end to the trough mounted on the movable band and movable towards and away from the withdrawal point by moving the band, and means to actuate the band to move in response to differences between the rate of feeding and the rate of withdrawal.

2. The storage bin claimed in claim 1 in which the band is an endless conveyor band with one end pulley mounted adjacent the withdrawal point.

3. The storage bin claimed in claim 1 including means for sensing the level of material over the withdrawal point and arranged to actuate the band to move the false end towards and away from the withdrawal point.

4. The storage bin claimed in claim 1 in which the fixed end of the trough is a run of an endless conveyor belt the run being arranged to move upwardly when the false end moves towards the withdrawal point.

5. The storage bin claimed in claim 4 in which said run is inclined over the withdrawal point at substantially the angle of repose of the material being stored.

6. The storage bin claimed in claim 1 for storing rod-shaped articles of equal length in which the width of the trough equals the length of the articles.

7. The bin claimed in claim 6 including a conveyor belt feeding the bin and having a delivery pulley, and a finger resting over the delivery pulley of the conveyor belt to assist the articles to retain their orientation.

References Cited

UNITED STATES PATENTS

| 2,406,992 | 9/1946 | Butler. | |
| 2,745,410 | 5/1956 | Molins | 198—37 X |
| 2,997,828 | 8/1961 | Ahlbor | 53—236 X |

GERALD M. FORLENZA, *Primary Examiner.*

EVON C. BLUNK, *Examiner.*

R. J. HICKEY, *Assistant Examiner.*